US008418057B2

(12) United States Patent (10) Patent No.: US 8,418,057 B2
Knight et al. (45) Date of Patent: Apr. 9, 2013

(54) SYSTEM AND METHOD FOR DISPLAYING TEXT

(75) Inventors: David H. Knight, Newington, NH (US); Andrew D. Knight, Belmont, MA (US)

(73) Assignee: Cambridge Reading Project, LLC, Belmont, MA (US)

( * ) Notice: Subject to any disclaimer, the term of this patent is extended or adjusted under 35 U.S.C. 154(b) by 251 days.

(21) Appl. No.: 11/142,201

(22) Filed: Jun. 1, 2005

(65) Prior Publication Data

US 2006/0277464 A1  Dec. 7, 2006

(51) Int. Cl.
*G06F 17/00* (2006.01)
(52) U.S. Cl.
USPC ........... 715/243; 715/244; 715/245; 715/249; 715/252; 715/253
(58) Field of Classification Search .......... 715/200–201, 715/205, 243–256, 273; 434/169, 178–179; 704/9; 345/471
See application file for complete search history.

(56) References Cited

U.S. PATENT DOCUMENTS

| | | | | |
|---|---|---|---|---|
| 1,456,834 A | 5/1923 | Sheffield | | 283/46 |
| 3,611,593 A | 10/1971 | Shapiro | | 434/178 |
| 4,643,450 A | 2/1987 | Morris | | 434/179 |
| 5,442,742 A | 8/1995 | Greyson et al. | | 715/539 |
| 5,475,399 A | 12/1995 | Borsuk | | 345/472 |
| 5,802,533 A * | 9/1998 | Walker | | 715/201 |
| 6,032,163 A * | 2/2000 | Tou et al. | | 715/531 |
| 6,113,147 A | 9/2000 | Johnson | | 283/62 |
| 6,154,757 A * | 11/2000 | Krause et al. | | 715/205 |
| 6,227,576 B1 * | 5/2001 | Gerou | | 285/46 |
| 6,279,017 B1 | 8/2001 | Walker | | 715/529 |
| 6,568,939 B1 * | 5/2003 | Edgar | | 434/179 |
| 7,069,508 B1 * | 6/2006 | Bever et al. | | 715/531 |
| 7,853,863 B2 * | 12/2010 | Sakai | | 715/200 |
| 2002/0133521 A1 * | 9/2002 | Campbell et al. | | 707/526 |
| 2005/0261891 A1 * | 11/2005 | Chan et al. | | 704/9 |

OTHER PUBLICATIONS

Friendly Type,web pages downloaded from WayBack Machine. Archive date Sep. 17, 2004 (<"http://web.archive.org/web/*hh_/www.friendlytype.com/">). Footer at bottom of screen-dumped page indicates a "posted" date of Sep. 2004 and a Copyright Year of 2004. Specific pages labeled "Home Page", "FAQ", and "Intro", 3 pages.*
Nahinsky, I. D., "The Influence of Certain Typographical Arrangements upon Span of Visual Comprehension," The Journal of Appfied Psychology, vol. 40, No. 1, pp. 37-39 (1956).*

(Continued)

*Primary Examiner* — Cesar Paula
*Assistant Examiner* — James H Blackwell
(74) *Attorney, Agent, or Firm* — Boyle Fredrickson, S.C.

(57) ABSTRACT

A method for displaying text arranged into word clusters on an electronic display including the steps of providing a text, arranging the text into a plurality of word clusters, where a plurality of clusters includes at least two lines and each line includes at least two words, and where at least one word can be emphasized. The provided text has a plurality of paragraphs with a plurality of sentences arranged into clusters each limited to a thought group based on a word or a plurality of words linked by commonality having an end defined by a text element. Cluster size can be constrained by an estimate of reader apprehension span and/or a readability analysis of the provided text based on word complexity which can take into account reader comprehension. An automated program configured to identify thought groups using such linguistic criteria can be employed to carry out the method.

19 Claims, 4 Drawing Sheets embassy embassy

OTHER PUBLICATIONS

North, A. J., et al., "Reading Speed and Comprehension as a Function of Typography," Journal of Appfied Psychology, vol. 35, No. 4, pp. 225-228 (Aug. 1951).*

Klare, G. R., et al., "The Relationship of Typographic Arrangement to the Learning of Technical Training Material," The Journal of Applied Psychology, vol. 41, No. 1, pp. 41-45 (1957).*

Andrews, R. B., "Reading Power Unlimited," Two Articles 1) "Square Span an Experiment in Type," The Reader's Digest, (Jul. 1949) and 2) Andrews, R. B., "Reading Power Unlimited," The Texas Outlook, 33, pp. 20-21 (Jan. 1949).*

Coleman, E. B., et al., "Comparison of Several Styles of Typography in English," The Joumal of Applied Psychology, vol. 45, No. 4, pp. 262-267 (1961).*

Tinker, M. A., "Perceptual and Oculomotor Efficiency in Reading Materials in Vertical and Horizontal Arrangements," American Joumal of Psychology, pp. 444-449 (1953).*

Oman, P. W. et al, "Typographic style is more than cosmetic," Commun. ACM 33, 5 (May 1990), pp. 506-520.*

Friendly Type, web pages downloaded from WayBack Machine. Archive date May 12, 2005 (<"http://web.archive.org/web/*/www.friendlytype.net/ftshop/home.php">). Copyright 2005, 7 pages.*

A. Arditi et al.,"Serifs and font legibility," Vision Research 45 (2005), Elsevier Ltd., pp. 2926-2933.*

Coleman, E. B., et al., "Comparison of Several Styles of Typography in English," *The Journal of Applied Psychology*, vol. 45, No. 4, pp. 262-267 (1961).

Nahinsky, I. D., "The Influence of Certain Typographical Arrangements upon Span of Visual Comprehension," *The Journal of Applied Psychology*, vol. 40, No. 1, pp. 37-39 (1956).

North, A. J., et al., "Reading Speed and Comprehension as a Function of Typography," *Journal of Applied Psychology*, vol. 35, No. 4, pp. 225-228 (Aug. 1951).

Tinker, M. A., "Perceptual and Oculomotor Efficiency in Reading Materials in Vertical and Horizontal Arrangements," *American Journal of Psychology*, pp. 444-449 (date unknown).

PCT, International Preliminary Report on Patentability, PCT/US06/20136 (Jul. 8, 2008).

\* cited by examiner

Fig. 1
Prior Art

As part of the response to the embassy bombings, President Clinton signed a Memorandum of Notification authorizing the CIA to let its tribal assets use force to capture Bin Ladin and his associates. CIA officers told the tribals that the plan to capture Bin Ladin, which had been "turned off" three months earlier, was back on.

As part of the response to the embassy bombings, — 12

26 →

President Clinton signed a Memorandum of Notification — 14 authorizing the CIA to let its tribal assets use force to capture — 16

Bin Ladin and his associates. — 18

CIA officers told the tribals that the plan to capture Bin Ladin, — 20 which had been "turned off" — 22 three months earlier, was back on. — 24 embassy

Fig. 3A embassy

Fig. 3B

*embassy*

Fig. 3C

<u>embassy</u>

Fig. 3D embassy

Fig. 3E embassy

Fig. 3F

EMBASSY

Fig. 3G embassy

Fig. 3H embassy

Fig. 3I embassy

44 ─── On an              ⎤
   44 ─────── exceptionally hot     ⎬─ 32
   42 ─────── evening early in July ⎦ a young man             ⎤
        came out of the garret      ⎦─ 34 in which he lodged        ⎤
             in S. Place            ⎦─ 36 and walked slowly,        ⎤
              as though             ⎦─ 38 in hesitation,          ⎤
          towards K. bridge.        ⎦─ 40
```

SYSTEM AND METHOD FOR DISPLAYING TEXT

TECHNICAL FIELD

The present invention is directed to a system and method for rearranging and displaying text and, more particularly, to a system and method for rearranging and displaying text in a manner conducive to comfortable and efficient reading.

BACKGROUND

In the English language, text typically is presented as a series of sentences grouped into paragraphs, as shown in FIG. 1. The text may flow from left to right across the width of a page (or column) and then vertically down the page (or column).

Researchers have recognized that the typical format for presenting text (i.e., the paragraph format) has several disadvantages and may violate the natural tendencies of the human eye. See Andrews, R. B., Reading Power Unlimited, *Texas Outlook*, 1949, 33, 20-21, the entire content of which are incorporated herein by reference. Particularly, the paragraph format does not fully take advantage of a reader's ability to read and comprehend text. The paragraph format focuses on the horizontal span of the human eye and ignores the human eye's ability to scan in the vertical direction.

Accordingly, Andrews (1949) presented the concept of square span, wherein text is broken down and arranged into a series of small units of words. Each unit typically includes 2 lines of words, with each line having 2 to 3 words. Thus, the reader may comprehend each unit as a whole, rather than a sum of its parts.

Andrews (1949) theorized that the square span arrangement of text allows for quicker and more efficient reading. Each unit of square span includes a vertical component (i.e., the lines are arranged vertically) and a horizontal component (i.e., the words in a line extend horizontally). Thus, the square span arrangement takes advantage of the relationship between the horizontal span and the vertical span of the human eye.

Various other techniques have been employed to facilitate faster and more efficient reading. U.S. Pat. No. 4,643,450 to Morris, the entire content of which are incorporated herein by reference, discloses a textual display wherein the text is presented as a plurality of short lines printed across a scan bar, wherein selected words are bolded or printed in a different color. U.S. Pat. No. 5,802,533 to Walker, the entire contents of which are incorporated herein by reference, discloses the concept of enhancing text by horizontally displacing consecutive lines of text.

Despite the attempts of the prior art, there remains a need for a system and method for displaying text in a manner conducive to comfortable and efficient reading.

SUMMARY

In one aspect, the system and method provides a method for displaying text including the steps of providing a text, arranging the text into a plurality of word clusters, wherein at least one selected word cluster of the plurality of word clusters includes at least two lines of words and each line of words includes at least two words, and emphasizing at least one word in the selected word cluster.

In another aspect, the system and method provides a method for displaying text including the steps of providing a text having a plurality of words, arranging the words into a plurality of word clusters, wherein at least two selected word clusters each include at least two lines of words and each line of words includes at least two words, and altering the typeface, the font and/or the color of at least one word in each of the selected word clusters with respect to the other words in the selected word clusters.

In another aspect, the system and method provides a textual display including a display medium and a text displayed on the display medium as a plurality of word clusters, wherein at least two selected word clusters each includes at least two lines of words and each line of words includes at least two words, wherein at least one word in each of the selected word clusters is emphasized.

In another aspect, the system and method provides a method for displaying text including the steps of providing a text, arranging the text into a plurality of word clusters, wherein at least one selected word cluster includes at least one spoken word and at least one non-spoken word, and altering the typeface, the font and/or the color of the spoken word with respect to the non-spoken word.

Other aspects of the system and method will become apparent from the following description, the accompanying drawings and the appended claims.

BRIEF DESCRIPTION OF THE DRAWINGS

FIG. 1 is a sample of text displayed in the paragraph format of the prior art;

FIG. 2 is the sample of text of FIG. 1 displayed according to a first aspect of the system and method;

FIG. 3A is a selected word of the text of FIG. 2 having a first appearance;

FIG. 3B is the selected word of FIG. 3A having a second appearance;

FIG. 3C is the selected word of FIG. 3A having a third appearance;

FIG. 3D is the selected word of FIG. 3A having a fourth appearance;

FIG. 3E is the selected word of FIG. 3A having a fifth appearance;

FIG. 3F is the selected word of FIG. 3A having a sixth appearance;

FIG. 3G is the selected word of FIG. 3A having a seventh appearance;

FIG. 3H is the selected word of FIG. 3A having a eighth appearance;

FIG. 3I is the selected word of FIG. 3A having a ninth appearance;

FIG. 3J is the selected word of FIG. 3A having a tenth appearance; and

FIG. 4 is a sample of text displayed according to a second aspect of the system and method.

DETAILED DESCRIPTION

As shown in FIG. 2, a text, such at the paragraph format text of FIG. 1, may be arranged as an array 10 of word clusters 12, 14, 16, 18, 20, 22, 24 on a display medium. The display medium may be any medium capable of displaying text, such as one or more sheets of paper, a book, a poster, a package or wrapping, an electronic display, a graphical user interface or the like. The array 10 may be presented on a single page or on a plurality of pages. For example, a book may be presented as an array 10 of word clusters 12, 14, 16, 18, 20, 22, 24 printed on a plurality of sheets of paper.

The array 10 may include one or more lines of word clusters 12, 14, 16, 18, 20, 22, 24 and/or one or more columns of word clusters. Alternatively, the array 10 of word clusters 12, 14, 16, 18, 20, 22, 24 may be arranged in a pattern other than lines and/or columns. For example, the word clusters 12, 14, 16, 18, 20, 22, 24 may be randomly arranged on one or more pages of the display medium.

The word clusters 12, 14, 16, 18, 20, 22, 24 of the array 10 may be arranged vertically across a page, wherein a consecutive word cluster is positioned below a preceding cluster, as shown in FIG. 2. Alternatively, the word clusters 12, 14, 16, 18, 20, 22, 24 of the array 10 may be arranged horizontally across a page, wherein a consecutive word cluster is positioned to the right (or left) of a preceding cluster. It should be understood that, once the end of a page is reached, the next word cluster may begin a new line or column.

Each word cluster 12, 14, 16, 18, 20, 22, 24 may include a plurality of words. In one aspect, a word cluster may include a minimum of two words and a maximum of fifty words. In another aspect, a word cluster may include a minimum of one word and a maximum of ten words.

Each word cluster 12, 14, 16, 18, 20, 22, 24 may include one or more lines. In one aspect, a word cluster may include a minimum of one line and a maximum of ten lines. In another aspect, a word cluster may include a minimum of one line and a maximum of six lines. In another aspect, a word cluster may include a minimum of two lines and maximum of four lines.

Each line of words in a word cluster 12, 14, 16, 18, 20, 22, 24 may include one or more words. In one aspect, a line may include a minimum of one word and a maximum of ten words. In another aspect, a line may include a minimum of one word and a maximum of six words. In another aspect, a line may include a minimum of two words and maximum of four words.

The maximum and minimum number of words, lines of words and/or words per line may be selected by the author, editor or the like or, alternatively, may be preprogrammed into a processing device adapted to arrange a text into word clusters.

In one aspect, the size of a word cluster (i.e., the maximum and minimum number of words, lines of words and/or words per line) may be dictated by the horizontal and vertical apprehension span of the reader. In another aspect, the size of a word cluster may be dictated by the complexity of the words within the word cluster. For example, a word cluster may be sized such that it is capable of being comprehended as a whole by a reader of average skill.

Referring to FIG. 2, word cluster 12 includes nine words arranged into three lines of words, wherein the first line of words includes five words, the second line of words includes three words and the third line of words includes one word.

Each word cluster 12, 14, 16, 18, 20, 22, 24 within the array 10 may be separated from adjacent word clusters by a space or margin 26. A space 26 may be provided to the left, right, top and/or bottom of a word cluster. The space 26 may include no text. In one aspect, the space 26 may be larger (e.g., about 1.5 to about 4 times larger) than the space between each word of the word cluster and/or the space between each line of the word cluster.

In one aspect, a word cluster 12, 14, 16, 18, 20, 22, 24 may be an individual thought group separated from the full text. A thought group may include a single word (e.g., an interjection, the word "boom" and/or other onomatopoeic words or the like) or a plurality of words linked by a commonality and constrained by an estimate of the apprehension span of a typical reader or by the limits for line length and number of lines per word cluster set by the user of the system and method.

Elements of commonality within a thought group may be one or more of the following: names (e.g., proper and/or common), nouns or verbs which rely on modifiers for understanding and their modifiers (e.g., noun clauses and phrases, phrasal verbs (preposition plus verb), infinitives ("to" plus verb stem) and/or prepositional phrases), phrases, dependent clauses and independent clauses.

Elements of text that may determine the end of a thought group may be one or more of the following: periods, question marks, exclamation points, commas, colons, semi-colons and other sentence terminating elements.

Accordingly, a text, such as the text presented in FIG. 1, may be broken down into an array 10 of word clusters 12, 14, 16, 18, 20, 22, 24 by identifying thought groups within the text. Referring to FIG. 1 for example, the first thought group may be identified by punctuation, such as the first comma of FIG. 1. Thus, the language "As part of the response to the embassy bombings," may be considered a thought group and arranged into a first word cluster 12, as shown in FIG. 2. For example, the word cluster 12 may be broken down into three lines, the first line being "As part of the response," the second line being "to the embassy" and the third line being "bombings."

Various other arrangements of the word cluster 12 are within the scope of the present system and method. For example, the first word cluster 12 may be arranged to include four lines, wherein the first line is "as part of," the second line is "the response," the third line is "to the embassy" and the fourth line is "bombings."

Thus, a text may be broken down into a plurality of thought groups, wherein each thought group may correspond to a single word cluster. As discussed above, thought groups may be identified using phrase boundaries, punctuation and word types. In another aspect, an author may choose his or her own thought groups. In another aspect, an automated program may be used to identify thought groups within a text by applying various linguistic criteria, such as the criteria discussed above.

Once a text has been broken down into an array 10 of word clusters 12, 14, 16, 18, 20, 22, 24, selected words within a word cluster may be emphasized by altering the typeface, changing the font and/or changing the color of the selected words with respect to the other words of the word cluster. As shown in FIG. 2, the words "embassy" and "bombings" have been emphasized by bolding the selected words.

Selected words may be emphasized in various ways. The words in the word cluster 12 may be presented in a Times New Roman typeface with a 14 point font, as shown in FIG. 3A. The word "embassy" may then be emphasized by altering the typeface of the word "embassy" with respect to the other word in the word cluster. For example, the word "embassy" may be bolded, as shown in FIGS. 2 and 3B, italicized, as shown in FIG. 3C or underlined, as shown in FIG. 3D. In another aspect, the word "embassy" may be presented in a different typeface, such as, for example, Arial, as shown in FIG. 3E, Century Gothic, as shown in FIG. 3F, Charlesworth, as shown in FIG. 3G, or Batang, as shown in FIG. 3H. In another aspect, the word "embassy" may be presented in a different font size, such as, for example, 18 point font, as shown in FIG. 3I, or 22 point font, as shown in FIG. 3J. In another aspect, selected words may be emphasized by changing the color of the word (e.g., from black to red).

In another aspect, one or more words of a word cluster may be de-emphasized. For example, a word may be de-emphasized by using a narrower or lighter typeface, a lighter color, a smaller font or the like. For example, a word may be de-emphasized by presenting the de-emphasized word in a Century Gothic typeface, shown in FIG. 3F, while the other words in the word cluster are presented in an Arial typeface, as shown in FIG. 3E.

Accordingly, by emphasizing one or more words within a word cluster 12, 14, 16, 18, 20, 22, 24, the reader's eyes are guided to the significant words within the word cluster.

In one aspect, content words (i.e., substantive words) within a word cluster may be emphasized and function words may be de-emphasized. Function words may be grammatical words that can be distinguished from content words such as nouns, verbs and adjectives. In one aspect, function words may be pronouns, auxiliaries, determiners, prepositions and other items that do not fall within any single syntactic category. In another aspect, function words may be all words that do not normally take stress.

In another aspect, an author or a speaker may identify words that should be emphasized based on the intent of the author and/or emphasis or de-emphasis placed on words when a particular speaker speaks those words.

Accordingly, once a text is broken down into an array of word clusters, the content words within each word cluster may be emphasized and, alternatively, one or more function words may be de-emphasized, thereby controlling the reader's eye movements such that the reader spends less effort focusing on specific words within the text.

In another aspect of the system and method, a text, generally designated 30, may be arranged into word clusters 32, 34, 36, 38, 40, as shown in FIG. 4 and described above, and the content words in each word cluster may be emphasized, as discussed above. Each word cluster 32, 34, 36, 38, 40 may include a last line 42 and at least one non-last line 44. Word clusters consisting of only one line may be considered to have one last line 42 and no non-last lines 44. In one aspect, the words in the non-last lines 44 may be present in a typeface having a reduced serif, while the words in the last line may be presented with a typeface having a full serif. In another aspect, the words in the non-last lines 44 may be present in a typeface having a normal serif, while the words in the last line may be presented with a typeface having an oversized serif.

For example, referring to word cluster 32 of FIG. 4, the word "evening" is in the last line 42 and the words "On an" are in the first non-last line 44. The letter "n" in the word "evening" has a larger serif than the letter "n" in the words "On an."

Without being limited to any particular theory, it is believed that a reduced serif in non-last lines 44 allows a reader's eyes to easily scan the contents of the word cluster, while a full (or larger) serif in the last line 42 allows a reader's eyes to identify the end of the word cluster.

Although the system and method for displaying text has been shown and described with respect to certain aspects, it should be understood that modifications may occur to those skilled in the art upon reading the specification. The system and method for displaying text includes all such modifications and is limited only by the scope of the claims.

What is claimed is:

1. A method for displaying text comprising the steps of:
   providing a text, said text having a plurality of paragraphs each having a plurality of sentences comprised of a plurality of words;
   determining a word cluster size based on a reading level complexity, said word cluster size defining a word cluster having a plurality of lines with a plurality of the lines each having a plurality of words;
   arranging said text into a plurality of separated and centered word clusters based on said determined word cluster size having (a) adjacent lines of each word cluster vertically spaced apart by a cluster line spacing that is substantially the same, (b) each pair of consecutive centered word clusters vertically aligned and spaced apart by a cluster spacing that is greater than said line spacing, and (c) each word of each one of said word clusters presented in a typeface having a serif with at least one word in the last line of at least one word cluster having a serif larger in size than a remainder of said words of said at least one word cluster; and
   displaying said plurality of word clusters on an electronic display medium.

2. The method of claim 1 further comprising the step of identifying at least one content word in at least one word cluster and emphasizing said at least one content word by altering a typeface, changing a font, changing a font size, or changing a color of said at least one content word.

3. The method of claim 2 further comprising the step of identifying at least one function word in said at least one word cluster and deemphasizing said at least one function word by lightening, narrowing, or decreasing a size of at least one of a typeface or a font of said at least one function word.

4. The method of claim 1 wherein said electronic display medium is configured to display a page at a time.

5. The method of claim 1, wherein said reading level complexity is based on a complexity of words within said word cluster.

6. The method of claim 5, wherein said word cluster size is further based on a reader of average skill.

7. The method of claim 1, wherein said word cluster size is determined based on said word cluster being comprehended by a reader of average skill.

8. The method of claim 1, wherein said word cluster size is constrained by one of an estimate of reader apprehension span and a predetermined word cluster line length and word cluster line number limit.

9. The method of claim 1, wherein said plurality of word clusters are defined by identifying a plurality of thought groups in said provided text comprised of a plurality of words linked by a commonality.

10. The method of claim 9, wherein said commonality linking said plurality of words comprising one of said word clusters comprises a name, a noun or verb which relies on a modifier for understanding, or a phrase, and wherein the end of said thought group of the one of said word clusters is defined by a comma, a colon, or a semicolon.

11. The method of claim 9, wherein said commonality linking said plurality of words comprising one of said word clusters comprises a name, a noun or verb which relies on a modifier for understanding, or a phrase, and wherein the end of said thought group of the one of said word clusters is defined by a period, question mark or exclamation point.

12. The method of claim 9, wherein each one of said thought groups corresponds to one of said word clusters.

13. The method of claim 1, wherein all of said words located in the last line of said at least one word cluster have a serif larger than the remainder of said words of said at least one word cluster.

14. A method for displaying text comprising the steps of:
    providing a text comprised of a plurality of paragraphs each having a plurality of sentences with each sentence having a plurality of words;
    arranging said text into a plurality of vertically centered and vertically aligned word clusters having a vertical cluster spacing between consecutive word clusters, each word cluster having a plurality of horizontally extending lines having a vertical line spacing between consecutive lines smaller than said vertical cluster spacing with each line having one or more words, and wherein each word cluster is formed of a thought group defined by a plurality of words linked by a commonality and constrained by an estimate of reader apprehension span, and wherein at least one word in the last line of at least one word cluster has a serif larger than a remainder of said words of said at least one word cluster; and displaying said plurality of word clusters on an electronic display medium.

15. The method of claim 14, wherein said commonality linking said plurality of words comprising one of said word clusters comprises a name, a noun or verb which relies on a modifier for understanding, or a phrase, and wherein the end of said thought group of the one of said word clusters is defined by a comma, a colon, or a semicolon.

16. The method of claim 14, wherein said commonality linking said plurality of words comprising one of said word clusters comprises a name, a noun or verb which relies on a modifier for understanding, or a phrase, and wherein the end of said thought group of the one of said word clusters is defined by a period, question mark or exclamation point.

17. The method of claim 14, the further step of determining a size of the plurality of word clusters based on a reading level complexity and during said arranging step, arranging said text into said plurality of word clusters based on said determined word cluster size.

18. The method of claim 14, wherein all of said words in a single the last line of said at least one word cluster have said larger serif.

19. A method for displaying text comprising the steps of:

providing a text comprised of a plurality of paragraphs each having a plurality of sentences with each sentence having a plurality of words;

arranging said text into an plurality of vertically centered and vertically aligned word clusters having a vertical cluster spacing between consecutive word clusters, each word cluster having a plurality of horizontally extending lines having a vertical line spacing between consecutive lines smaller than said vertical cluster spacing with each line having a plurality of words, and wherein each word cluster is formed of a thought group defined by a plurality of words linked by a commonality and constrained by one of an estimate of reader apprehension span and a predetermined cluster line length and cluster line number limit with each pair of adjacent word clusters separated by a vertical space larger than the vertical space between adjacent lines of said adjacent word clusters, and wherein each word of each one of said word clusters is presented in a typeface having a serif with at least one of said words in the last line of at least one of said word clusters having a serif larger than a remainder of said words of said at least one word cluster; and displaying said plurality of word clusters on an electronic display medium.

\* \* \* \* \*